(12) United States Patent
Steinwinter (10) Patent No.: US 12,166,917 B2
(45) Date of Patent: Dec. 10, 2024

(54) COMPUTER-AUTOMATED SYSTEM AND METHOD FOR OBTAINING ASSISTANCE FOR TELEPHONE CALLS FROM UNKNOWN CALLERS

(71) Applicant: Mark Steinwinter, Watertown, MA (US)

(72) Inventor: Mark Steinwinter, Watertown, MA (US)

( * ) Notice: Subject to any disclaimer, the term of this patent is extended or adjusted under 35 U.S.C. 154(b) by 168 days.

(21) Appl. No.: 17/688,342

(22) Filed: Mar. 7, 2022

(65) Prior Publication Data

US 2023/0283710 A1 Sep. 7, 2023

(51) Int. Cl.
*H04M 3/00* (2024.01)
*H04M 3/22* (2006.01)

(52) U.S. Cl.
CPC ................................ *H04M 3/2281* (2013.01)

(58) Field of Classification Search
CPC .................................................. H04M 3/2281
USPC ............................................ 379/188, 201.01
See application file for complete search history.

(56) References Cited

U.S. PATENT DOCUMENTS

| | | |
|---|---|---|
| 7,747,265 B1 | 6/2010 | Ruf |
| 8,380,503 B2 | 2/2013 | Gross |
| 8,582,743 B2 * | 11/2013 | Teng .................... H04M 7/0054 370/260 |
| 8,942,357 B2 | 1/2015 | Goulet |
| 9,226,159 B1 | 12/2015 | Cao et al. |
| 9,426,288 B2 | 8/2016 | Farrand et al. |
| 9,553,985 B2 | 1/2017 | Cohen |
| 9,614,959 B2 | 4/2017 | Gonzales |
| 9,712,670 B2 | 7/2017 | Korn |
| 9,736,300 B2 | 8/2017 | Cook |
| 9,900,431 B1 * | 2/2018 | Kreiner .................. H04M 1/665 |
| 10,051,121 B2 | 8/2018 | Quilici et al. |
| 10,165,115 B1 | 12/2018 | Kreiner |
| 10,798,241 B1 * | 10/2020 | Quilici ............. H04M 3/42059 |
| 10,951,756 B1 | 3/2021 | Silverstein |
| 11,005,992 B1 * | 5/2021 | Chang .................... H04M 3/436 |
| 11,943,387 B1 * | 3/2024 | Wolinsky ............ H04M 3/2281 |
| 2004/0128383 A1 * | 7/2004 | Hinton .................. H04L 63/104 709/225 |

(Continued)

FOREIGN PATENT DOCUMENTS

| | | |
|---|---|---|
| CN | 102223431 B | 3/2017 |
| CN | 109348036 A | 2/2019 |

(Continued)

OTHER PUBLICATIONS

International Search Report and Written Opinion issued in App. No. PCT/US2023/013681, mailing date Jun. 19, 2023, 9 pages.

*Primary Examiner* — William J Deane, Jr.
(74) *Attorney, Agent, or Firm* — Blueshift IP; Robert Plotkin (57) ABSTRACT

A call, directed to a callee, is received from a caller. A computer system determines whether the caller is human. A computer system initiates a call to the callee only if the caller is determined to be human. If the callee initiates a request for help during the call, the system generates requests for help to a plurality of helpers associated with the callee. If any of the helpers accepts the request for help, the system connects that helper to the existing call between the caller and the callee, resulting in a conference call among the caller, callee, and helper.

22 Claims, 5 Drawing Sheets

(56) References Cited

U.S. PATENT DOCUMENTS

| | | |
|---|---|---|
| 2009/0083826 A1 | 3/2009 | Baribault |
| 2009/0207987 A1 | 8/2009 | Ryan |
| 2010/0161579 A1* | 6/2010 | Fan ...................... G06F 16/951 |
| | | 707/706 |
| 2013/0329865 A1* | 12/2013 | Ristock ............... H04L 12/1818 |
| | | 379/202.01 |
| 2014/0273987 A1 | 9/2014 | Price |
| 2015/0178312 A1* | 6/2015 | Pant ..................... H04W 4/023 |
| | | 707/722 |
| 2015/0334231 A1* | 11/2015 | Rybak .................. H04M 3/533 |
| | | 455/414.1 |
| 2017/0142252 A1* | 5/2017 | Bhupati .............. H04M 3/2281 |
| 2017/0289349 A1* | 10/2017 | Ou ....................... H04M 3/567 |
| 2018/0324297 A1* | 11/2018 | Kent .................... H04Q 3/0083 |
| 2018/0336233 A1* | 11/2018 | Barak .................... G06N 3/006 |
| 2021/0075910 A1 | 3/2021 | Huet |
| 2021/0281678 A1 | 9/2021 | Vale et al. |
| 2021/0306456 A1 | 9/2021 | Kanagala |

FOREIGN PATENT DOCUMENTS

| | | |
|---|---|---|
| JP | 2006197376 A | 7/2006 |
| JP | 2013038750 A | 2/2013 |
| WO | 2007042352 A1 | 4/2007 |

* cited by examiner

COMPUTER-AUTOMATED SYSTEM AND METHOD FOR OBTAINING ASSISTANCE FOR TELEPHONE CALLS FROM UNKNOWN CALLERS

BACKGROUND

Unsolicited telephone calls have become increasingly prevalent, irritating, and even dangerous in recent years. Such calls take a wide variety of forms, including calls made manually by human telemarketers, calls dialed automatically by software and then engaged in by human callers, and fully automated "robocalls," which are initiated by and engaged in entirely using software (which often use pre-recorded messages of human speakers in an attempt to trick the call recipient into believing that the caller is human). The purpose of such calls may include, for example, to solicit donations for a charity, to persuade voters to vote for a political candidate, or to defraud the recipient as part of a scam. Robocalls often target the elderly, who are more likely to be trusting of those who call them, and therefore are more likely to fall prey to malicious fraudsters.

Robocalls impose serious costs on individuals and on the economy as a whole. For example, a recent Harris poll found that about 1 in 6 Americans were scammed by telephone in 2021. The average amount lost was over $500, while some victims lost their entire life savings. Overall, Americans lost $29.8 billion to telephone scams in 2021. Even though seniors can be a risk for telephone scams, most victims are in the 18-44 age range. Many people are easily intimidated by threats and high-pressure tactics, while others are lulled into a false sense of security by a friendly-sounding huckster.

Although a variety of technologies exist for identifying and blocking such calls, those technologies have a variety of drawbacks. For example, and as is the case with any kind of technology that attempts to identify unwanted and/or harmful communications (such as antivirus software), the perpetuators of such communications continuously study the latest blocking technology, and use what they learn to tailor their communications in an effort to avoid being detected and blocked by that technology. As a simple example, robocall blocking technology that relies on a list of phone numbers from which robocalls are known to initiate can be evaded by obtaining and placing robocalls from phone numbers that are not on the list. The vendors of robocall blocking software respond to such efforts by adding any new numbers from which robocalls are placed to their block lists. This pattern, sometimes referred to as a "game of cat and mouse" or "arms race," is typical of any field in which technology is developed and deployed to identify and block communications from undesired sources.

For this and other reasons, and despite the best efforts of robocall blocking software vendors, robocalls (and other forms of unwanted telephone calls) continue to be a significant problem. As a result, many businesses and individuals have chosen to adopt a policy or habit of never answering telephone calls from unknown telephone numbers. This lack of confidence in the ability of existing robocall blocking software demonstrates that there is a need for improvements in technology for identifying and blocking robocalls and other forms of unwanted telephone calls.

SUMMARY

A call, directed to a callee, is received from a caller. A computer system determines whether the caller is human. A computer system initiates a call to the callee only if the caller is determined to be human. If the callee initiates a request for help during the call, the system generates requests for help to a plurality of helpers associated with the callee. If any of the helpers accepts the request for help, the system connects that helper to the existing call between the caller and the callee, resulting in a conference call among the caller, callee, and helper.

Other features and advantages of various aspects and embodiments of the present invention will become apparent from the following description and from the claims.

DETAILED DESCRIPTION

In general, in some embodiments of the present invention, a call, directed to a callee, is received from a caller. A computer system determines whether the caller is human. A computer system initiates a call to the callee only if the caller is determined to be human. If the callee initiates a request for help during the call, the system generates requests for help to a plurality of helpers associated with the callee. If any of the helpers accepts the request for help, the system connects that helper to the existing call between the caller and the callee, resulting in a conference call among the caller, callee, and helper. As a result, the helper may assist the callee in conducting the telephone call with the caller, such as by taking steps to protect the callee against fraud by the caller.

Figure 1A:
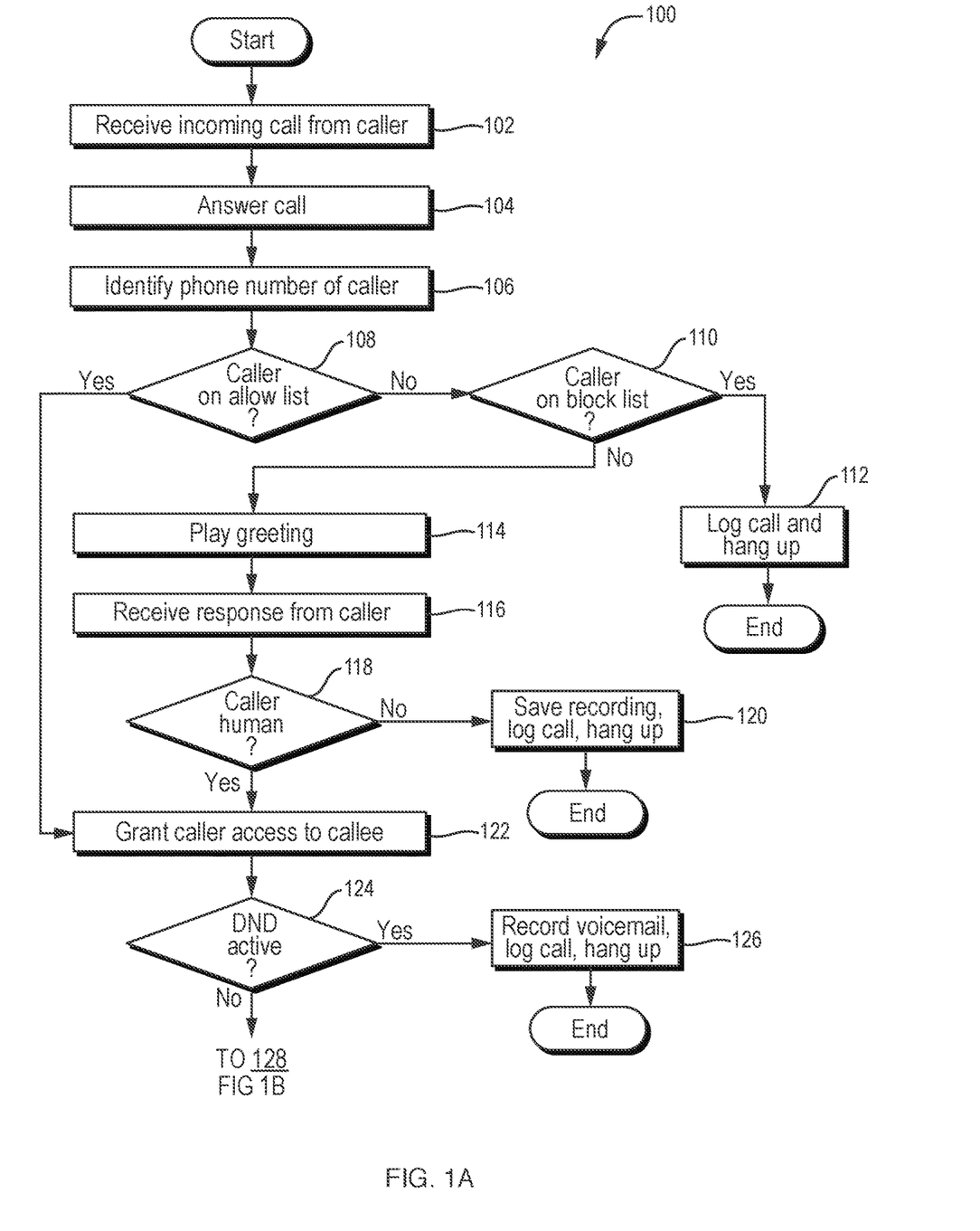
FIGS. 1A-1B are flowcharts of a method performed by one embodiment of the present invention to screen telephone callers and to obtain help for recipients of telephone calls from unknown callers.
Figure 1B:
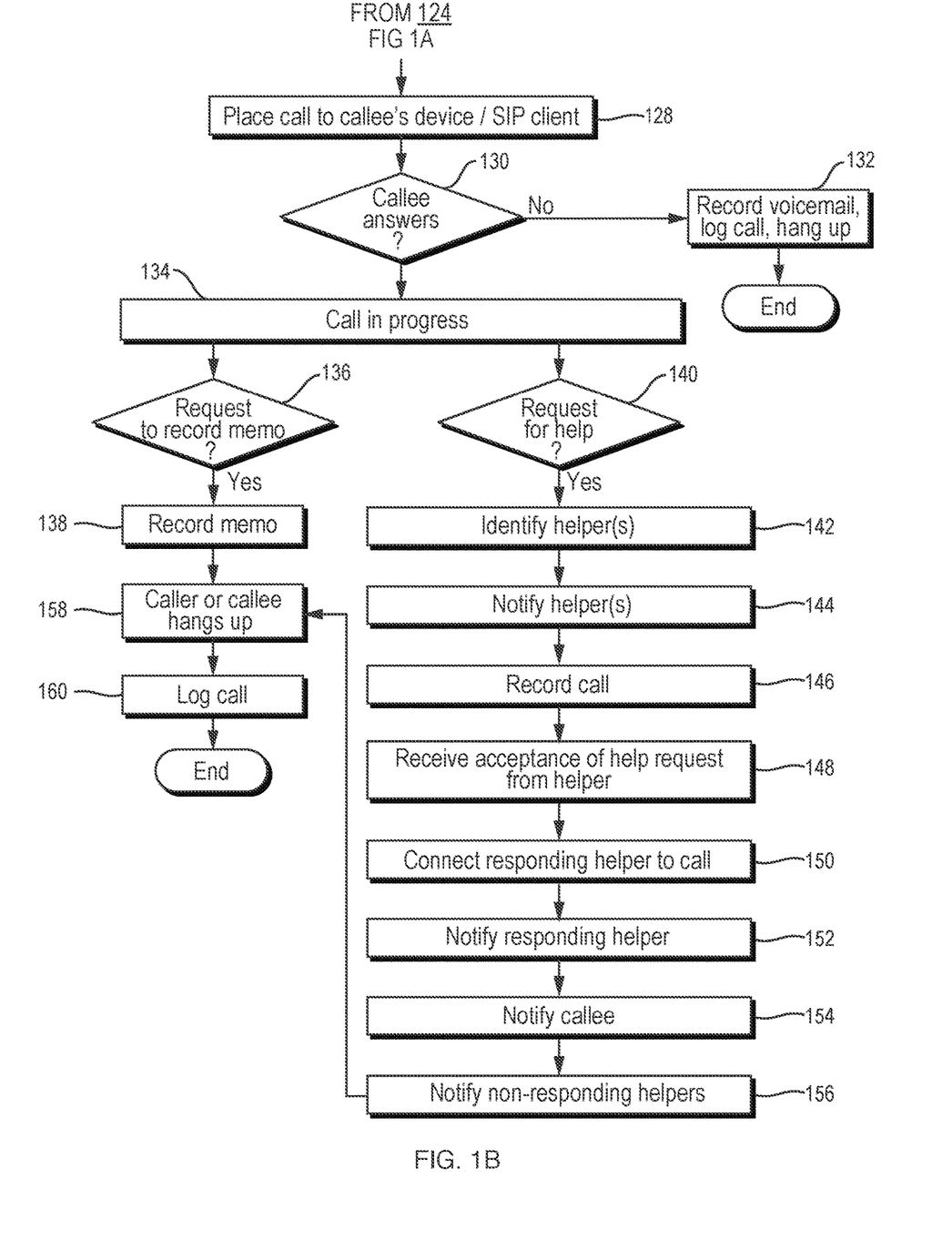
Figure 2A:
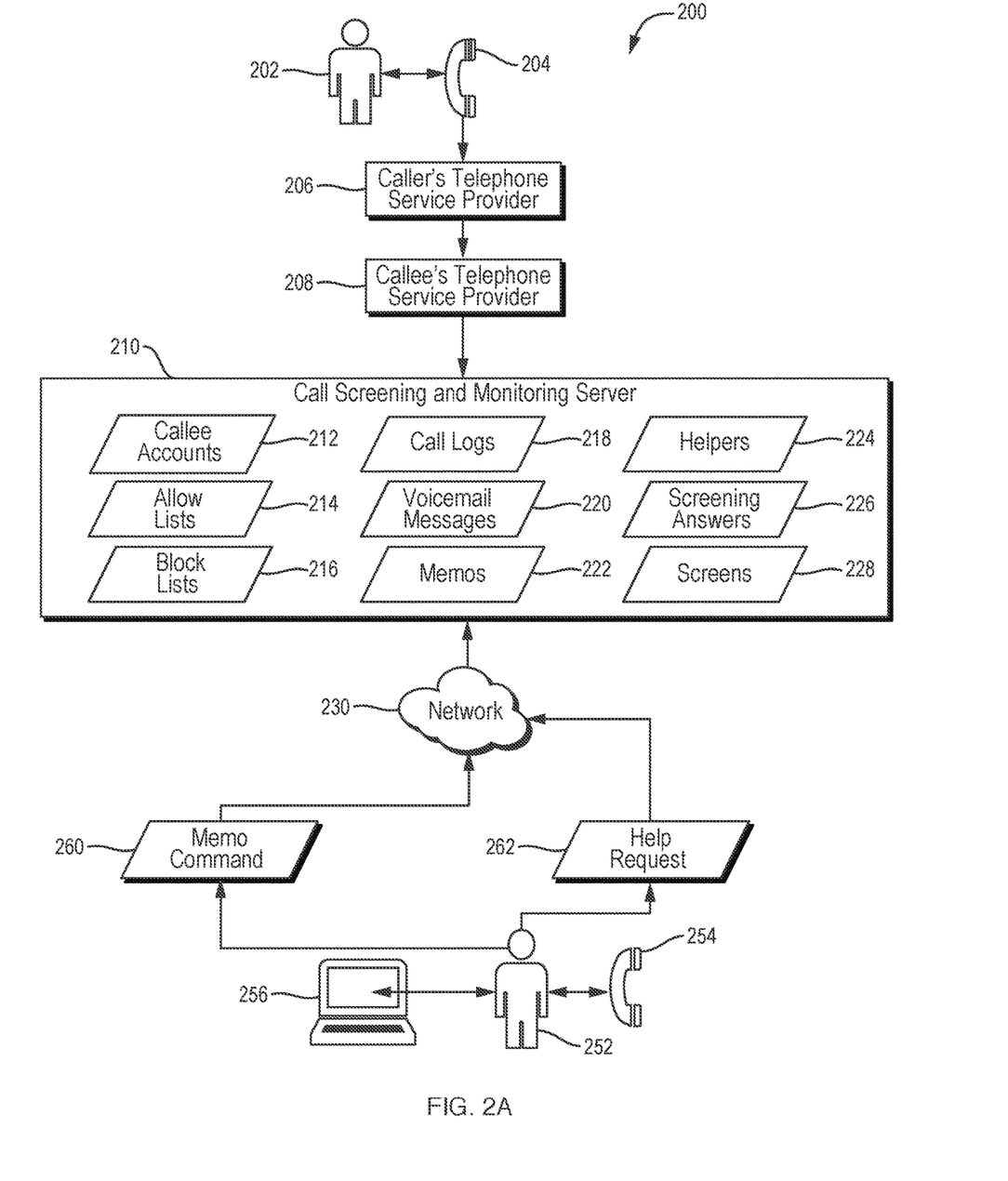
FIGS. 2A-2B are dataflow diagrams of systems for performing the method of FIGS. 1A-1B according to one embodiment of the present invention.
Figure 2B:
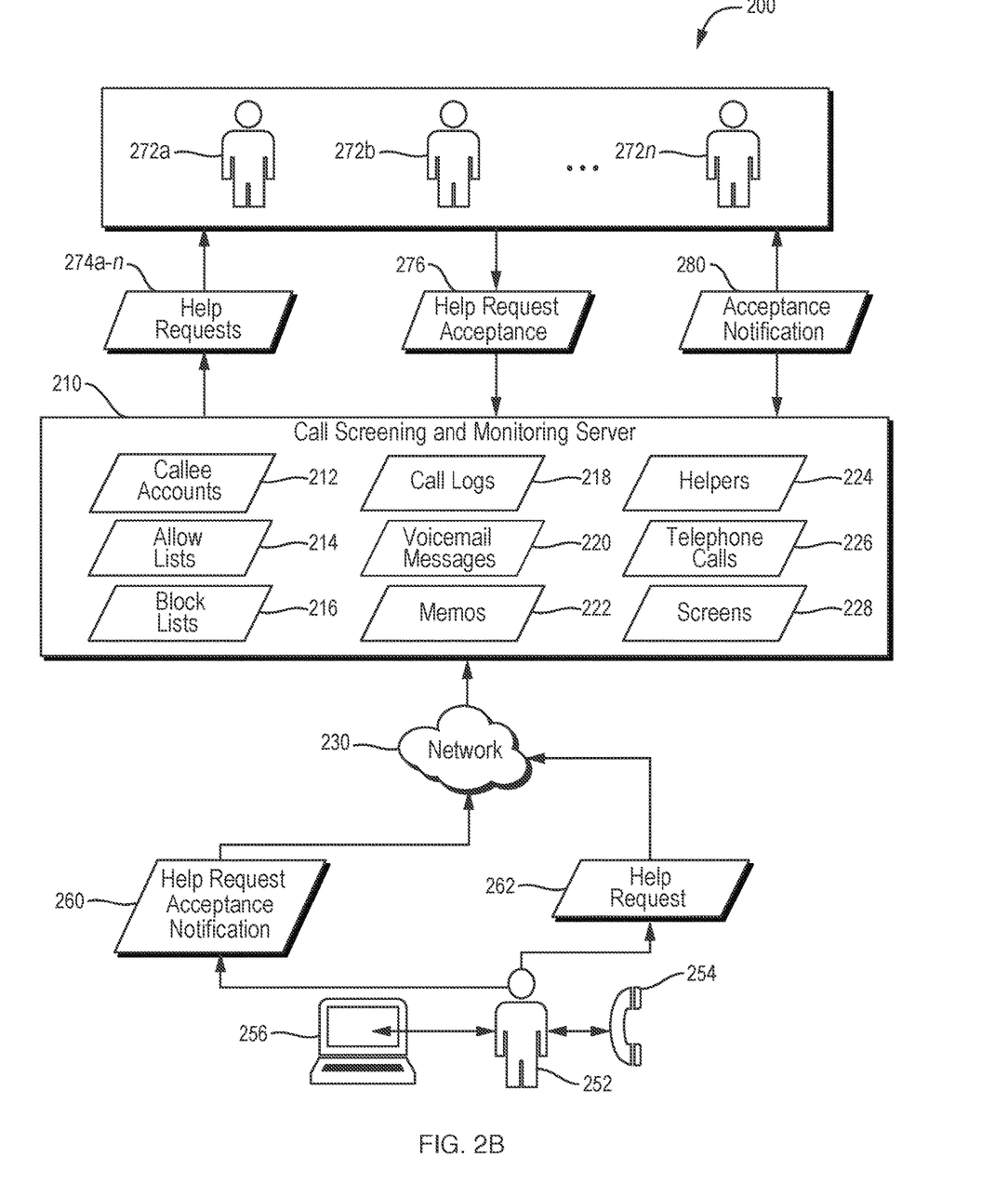

For example, referring to FIGS. 1A-1B, flowcharts are shown of a method 100 performed according to one embodiment of the present invention. Referring to FIGS. 2A-2B, dataflow diagrams are shown of systems 200 and 270 for performing the method 100 of FIGS. 1A-1B according to one embodiment of the present invention. Although some elements of the system 200 of FIG. 2A are not shown in the system 270 of FIG. 2B, and vice versa, the system 200 of FIG. 2A may include all of the elements shown in FIGS. 2A and 2B, and the system 270 of FIG. 2B may include all of the elements shown in FIGS. 2A and 2B.

The system 200 includes a caller 202. The caller 202 may, for example, be a human, a machine (e.g., a computer), software, or any combination thereof. The caller 202 uses a first telephone system 204 to initiate a telephone call in an attempt to reach a human callee 252. The first telephone system 204 may be any kind of device(s) capable of initiating and participating in telephone calls, such as any one or more of the following in any combination: a Plain Old Telephone Service (POTS) telephone (analog and/or digital), a cellular telephone, or a Voice over Internet Protocol (VoIP) phone. The first telephone system 204 may be or include, for example, a computer executing software, such as VoIP software, for placing, receiving, and otherwise engaging in telephone calls. The term "telephone call," as used herein, encompasses any form of electronic communication that includes live voice communication between a caller and callee, using any suitable telephone system(s), such as a POTS telephone call, a cellular telephone call, a VoIP telephone call, a videoconference call, or an audio chat.

The caller 202 may attempt to initiate the telephone call to the intended callee 252 by, for example, dialing or otherwise entering a telephone number associated with the callee 252, such as a telephone number of a telephone system 254 associated with the callee 252. As in the case of the caller 202's telephone system 204, the callee 252's telephone system 254 may be any kind of device(s) capable of initiating and making telephone calls, and may be or include, for example, a computer executing software, such as Skype, for placing and/or receiving and otherwise engaging in telephone calls.

In response to the caller 202's attempt to initiate the telephone call to the callee 252, the caller 202's telephone system 204 may initiate a call, directed to the callee 252's telephone number, using the caller 202's telephone service provider 206. The term "service provider" is used herein to refer generally to a service provider, carrier, and/or any other system and/or entity that enables telephone calls to be initiated, received, and/or conducted.

The callee 252's telephone service provider 208 receives the telephone call from the caller 202's telephone service provider 208. Assume, for the purposes of the following description, that the callee 252's telephone service provider 208 is configured to forward incoming telephone calls that are directed to the callee 252's telephone number (e.g., the telephone number associated with the callee 252's telephone system 254) to a second telephone number (referred to as the callee 252's "call screening telephone number") that is associated with a call screening and monitoring server 210.

The call screening and monitoring server 210 may be implemented in any of a variety of ways to perform the functions disclosed herein. For example, the call screening and monitoring server 210 may include one or more computers that execute software for performing the functions disclosed herein. The call screening and monitoring server 210 may include one or more telephone systems for performing the functions disclosed herein, such as one or more private branch exchange (PBX) servers. Furthermore, the term "server" does not imply that the call screening and monitoring server 210 must act as a server in a client-server architecture. Instead, the call screening and monitoring server 210 may be implemented in any suitable way to perform the functions disclosed herein.

The callee 252's telephone service provider 208 determines that calls directed to the callee 252's telephone system 254 are to be forwarded to the callee 252's call screening telephone number and, in response to that determination, forwards the call received from the caller 202's telephone system 254 to the callee 252's telephone system 254. The call screening and monitoring server 210 receives this forwarded telephone call (FIG. 1A, operation 202).

The call forwarding operation described above may include more than one layer of call forwarding. For example, the callee 252's telephone server provider 208 may forward the call to a telephone number associated with an intermediate telephone call server, which may receive that forwarded call and then place another telephone call (e.g., a Session Initiation Protocol (SIP) telephone call) to the call screening and monitoring server 210. Although only one call forwarding operation is described herein, this is merely an example, and embodiments of the present invention are not limited to any particular kind(s) and/or number of forwarding operations in the process of forwarding the telephone call placed by the caller 202 to the call screening and monitoring server 210.

Regardless of how the telephone call from the caller 202 is forwarded to the call screening and monitoring server 210, the call screening and monitoring server 210 receives and answers the forwarded telephone call (FIG. 1A, operation 104). The call screening and monitoring server 210 identifies the telephone number of the caller 202 (e.g., the telephone number of the caller 202's telephone system 204) based on the incoming telephone call (FIG. 1A, operation 106). Such identification may be performed automatically using any of a variety of known techniques, including Caller Identification (Caller ID).

Before describing operation of the system 200 in more detail, certain elements of the call screening and monitoring server 210 will be described. The call screening and monitoring server 210 may include one or more callee accounts 212. Each such account may include data associated with a particular corresponding callee. For example, the callee accounts 212 may include an account associated with the callee 252 and one or more accounts associated with callees other than the callee 252. The data in the different accounts 212 may differ from each other in any of a variety of ways. For example, and without limitation, each of the callee accounts 212 may include, or otherwise be associated with, any one or more of the following data, in any combination, for the callee who is associated with that account:

Real name

Username

Password

Demographic data (e.g., age, gender, address)

Telephone number (e.g., the telephone number of the callee 252's telephone system 254)

An allow list 214, containing telephone numbers (and optionally additional data, such as name) of callers from whom telephone calls directed to the callee are desired to be allowed A block list 216, containing telephone numbers (and optionally additional data, such as name) of callers from whom telephone calls directed to the callee are desired to be blocked Call logs 218 of telephone calls engaged in by the callee (e.g., the telephone call engaged in by the caller 202 and the callee 252)

Voicemail messages 220 recorded by caller (e.g., the caller 202) when making telephone calls to the callee, and which the callee did not answer Voice memos 222 recorded of telephone calls and commencing when the callee 252 initiated a memo 260 or a help request 262 during a call A list of human helpers 224 associated with the callee Spiels 226, i.e., recordings of utterances spoken by callers 202 during the call screening process A set of screening questions and correct answers 228 (also referred to herein as "screens") to be used to determine whether callers are human In the particular example of FIG. 2A, the callee accounts 212 and the other data within the call screening and monitoring server 210 (e.g., the data 214-228) are shown as distinct from each other. In that case, each record within the data 214-228 may include data identifying the corresponding callee account. For example, each of the call logs 218 may include data identifying the callee account (within the callee accounts 212) of the callee who participated in the call represented by that call log. This is one example of a way in which each unit (e.g., record) of the data 214-228 may be associated with a corresponding one of the callee accounts 212.

Furthermore, any unit (e.g., record) of the data 214-228 may be associated with one or more of the callee accounts 212. As just one example, a blocked caller in the block lists 216 may be associated with a specific one of the callee accounts 212, or with a plurality of the callee accounts 212. Any reference to "the block list" associated with a callee should be understood to refer to that subset of the block lists 216 which is associated with the callee. The same is true of any of the data 214-228.

Any of the data 212-228 shown within the call screening and monitoring server 210, and any of the functions disclosed herein as being performed by the call screening and monitoring server 210 may, additionally or alternatively, be implemented outside of the call screening and monitoring server 210, such as on a storage device and/or computing device that is distinct from the call screening and monitoring server. For example, some or all of such data 212-228 may be stored on, and any such functions of the call screening and monitoring server 210, may be implemented on one or both of the callee 252's telephone system 254 and a computing device 256 that is associated with the callee 252.

The computing device 256 may be any kind of computing device 256, such as a desktop computer, laptop computer, tablet computer, smartphone, or smart watch. The computing device 256 may include and execute software for performing any of the functions disclosed herein, including some or all of the functions disclosed as being performed by the call screening and monitoring server 210. Such software may, for example, include means for communicating as a client with the call screening and monitoring server 210 according to a client-server architecture.

The computing device 256 and the telephone system 254 may be physically distinct from each other. For example, the telephone system 254 may be a cellular telephone and the computing device 256 may be a desktop or laptop computer that is physically distinct from the cellular telephone. The computing device 256 and the telephone system 254 may or may not be coupled to or otherwise in communication with each other. For example, the computing device 256 and the telephone system 254 may have no connection (wired or wireless) with each other and may not be in communication with each other. Alternatively, the computing device 256 and the telephone system 254 may be coupled to each other (by wire and/or wirelessly), such as via one or more cables, direct wireless connection (e.g., a Bluetooth connection), a Local Area Network (LAN) connection, or a Wide Area Network (WAN) connection (e.g., an Internet connection).

For example, the call screening and monitoring server 210 may be accessible to the callee 252 (e.g., via the callee 252's telephone system 254 and/or computing device 256) over a network 230, such as a telephone network and/or the Internet, whereas the callee 252 may have direct physical access to the telephone system 254 and/or the computing device 256, i.e., without accessing the telephone system 254 and/or the computing device 256 over a network. For example, the callee 252 may provide direct physical input to the telephone system 254 and/or computing device 256 via one or more input devices, such as any one or more of a keyboard, mouse, touchscreen, and/or microphone, and receive direct output from the telephone system 254 and/or computing device 256 via one or more output devices, such as any one or more of a monitor (e.g., touchscreen) and/or speaker(s).

The telephone system 254 and computing device 256 may be integrated with each other in any of a variety of ways. For example, a single device may include and perform some or all of the disclosed functions of both the telephone system 254 and the computing device 256. As one example of this, a single computing device (e.g., a smartphone, desktop computer, laptop computer, or tablet computer) may include one or more apps which perform the functions disclosed herein for the telephone system 254 and the computing device 256. Such a single computing device may also perform some or all of the functions of the call screening and monitoring server 210 disclosed herein.

Returning to FIG. 1A, the call screening and monitoring server 210 determines whether the telephone number of the incoming telephone call is on the callee 252's allow list (FIG. 1A, operation 108). As implied by the description above, such a determination may be made, for example, by identifying the callee 252's allow list (e.g., within the callee 252's account in the callee accounts 212, or within the allow lists 214) and determining whether the telephone number of the incoming telephone call is on that allow list. If the telephone number of the incoming telephone call is determined to be on the callee 252's allow list, then the call screening and monitoring server 210 grants the caller 202 with access to the callee 252 (FIG. 1A, operation 122). It should be understood that "granting access to the callee 252" may, for example, merely include proceeding to the next step in the method 100 (i.e., step 124), and not granting the caller 202 with access to the callee 252, the callee 252's telephone system 254, or the callee 252's computing device 256.

In some embodiments of the present invention, the call screening and monitoring server 210 performs one or both of the following automatically in response to determining that the caller 202 is human in operation 118: (1) adds the caller 202's telephone number to the callee 252's allow list (e.g., within the allow lists 214); (2) removes the caller 202's telephone number from the callee 252's block list (e.g., within the block lists 216). The call screening and monitoring server 210 may keep such automatically-added callers on the callee 252's allow list indefinitely, or may remove each such automatically-added caller from the callee 252's allow list after some predetermined amount of time (e.g., 60 days) has passed.

If the telephone number of the incoming telephone call is not determined to be on the callee 252's allow list, then the call screening and monitoring server 210 determines whether the telephone number of the incoming telephone call is on the callee 252's block list (FIG. 1A, operation 110). As implied by the description above, such a determination may be made, for example, by identifying the callee 252's block list (e.g., within the callee 252's account in the callee accounts 212, or within the block lists 216) and determining whether the telephone number of the incoming telephone call is on that block list. If the telephone number of the incoming telephone call is determined to be on the callee 252's block list, then the call screening and monitoring server 210 logs the incoming telephone call and hangs up the incoming telephone call (FIG. 1A, operation 112).

The call screening and monitoring server 210 may include one or more call logs 218. The call screening and monitoring server 210 may log the incoming telephone call in operation 112 (and in operations 120, 126, and 160, described below) by, for example, storing information about the incoming telephone call in the call logs 218. Such information may, for example, include any one or more of the following, in any combination:

The telephone number from which the incoming telephone call was received (e.g., the telephone number of the caller 202's telephone system 204).

The name of the caller 202, if available from the caller 202's telephone service provider 208 or present in the callee 252's contact list.

The telephone number to which the incoming telephone call was directed (e.g., the telephone number of the callee 252's telephone system 254).

The time (e.g., date and/or time of day) at which the incoming telephone call was received.

The duration of the incoming telephone call.

An audio recording of some or all of the incoming telephone call.

If the telephone number of the incoming telephone call is not determined to be on the callee 252's block list (which implies that that telephone number is not on the callee 252's allow list 214 or the callee 252's block list 216), then the call screening and monitoring server 210 determines whether the incoming telephone call is being made by a human (e.g., whether the caller 202 is a human) (FIG. 1A, operation 118). The call screening and monitoring server 210 may make this determination in any of a variety of ways, such as by playing one or more greetings 114 on the incoming telephone call (FIG. 1A, operation 114), receiving a response to each of those greetings (FIG. 1A, operation 116) and determining, based on the response(s) received from the caller 202, whether the caller 202 is a human. In order to record the caller 202's responses, the call screening and monitoring server 210 may begin to record the call (or at least the caller 202's audio and/or other input (e.g., touch tones) on the call) in response to determining that the caller 202 is not on the block list in operation 110.

The call screening and monitoring server 210 may create store the caller 202's responses within a set of stored screening answers 226 (also referred to herein as "spiels") associated with the current call. Those answers may be stored in any of a variety of forms, such as any one or more of the following, in any combination: (1) audio of the caller 202's spoken responses to the greetings; (2) automatically transcribed text of the caller 202's spoken responses to the greetings; and (3) data representing touch tone responses to the greetings. The greetings themselves may also be stored within the screening answers 226. As with the other data disclosed herein, the screening answers 226 may include answers recorded in association with a plurality of telephone calls, and although the screening answers 226 are shown as distinct from the callee accounts 212, each set of screening answers within the screening answers 226 may be stored within, or otherwise in association with, the callee account associated with the callee who was called by the caller who provided those screening answers.

Furthermore, more generally, any of the screening answers 226 may or may not be "answers." Instead, they may be any input provided by the caller 202 that is used by the call screening and monitoring server 210, whether or not such input was provided in response to a greeting or other output from the call screening and monitoring server 210. For example, anything spoken by the caller 202 during the telephone call may be recorded as a spiel within the screening answers 226. More specifically, after answering the call in operation 104, the call screening and monitoring server 210 may begin recording the call (including the caller 202's speech and/or other input, such as touch tone inputs), and store any such input received from the caller 202 within the caller 202's spiel in the screening answers 226.

In some embodiments of the present invention, the call screening and monitoring server 210 determines whether the incoming telephone call is being made by a human in operation 118 by using the screens 228 as follows. The call screening and monitoring server 210 identifies, within the screens 228, that subset of the screens 228 that is associated with the callee 252 (referred to herein as "the callee 252's screens"). Such a subset may include all of the screens 228, or may include fewer than all of the screens 228. Each of the screens 228 may, for example, include a question (a "screening question") and one or more corresponding correct answers. Each such question and answer may, for example, be in text and/or audio form. The call screening and monitoring server 210 provides, as output to the caller 202, some or all of the questions within the callee 252's screens. The call screening and monitoring server 210 may, for example, select fewer than all of the callee 252's screens (e.g., by selecting that proper subset randomly), and provide only the questions within the selected screens to the caller 202.

The caller 202 may or may not provide input (such as voice input, text input, or touchtone input) to the call screening and monitoring server 210 in response to each of the callee 252's screening questions. Such input may, for example, be provided within, and received by the call screening and monitoring server 210 within, the existing ongoing telephone call between the caller 202 and the callee 252.

To determine whether input received from the caller 202 is correct, the call screening and monitoring server 210 may identify the correct answer to the screening question by identifying the screen that contains the screening question, and identifying the correct answer within that screen. The call screening and monitoring server 210 may determine that the caller 202 is human only if the caller 202's responses to the callee 252's screening questions satisfying an accuracy criterion, such as:

All of the caller 202's responses to the callee 252's screening questions are correct At least a particular predetermined number of the caller 202's responses to the callee 252's screening questions are correct At least a particular predetermined percentage of the caller 202's responses to the callee 252's screening questions are correct The call screening and monitoring server 210 may, for example, treat a failure by the caller 202 to respond to a particular screening as an incorrect answer to that screen. In some embodiments of the present invention, the call screening and monitoring server 210 provides all of the callee 252's screening questions to the caller 202, regardless of the caller 202's answers to the callee 252's screening questions (e.g., even if some of those answers are incorrect). In other embodiments of the present invention, the call screening and monitoring server 210 terminates the screening process in response to determining that even one of the caller 202's answers is incorrect, stops providing screening questions to the caller 202, and determines that the caller 202 is not a human. This may result in the call screening and monitoring server 210 providing fewer than all of the callee 252's screening questions to the caller 202.

If the call screening and monitoring server 210 does not determine that the caller 202 is a human, then the call screening and monitoring server 210 may save any recording that has been made of the caller 202, update the call log for the incoming call, and hang up on the incoming call (FIG. 1A, operation 120). As part of operation 120, the call screening and monitoring server 210 may, for example, hang up immediately in response to determining that the caller 202 is not a human. Alternatively, for example, the call screening and monitoring server 210 may, after determining that the caller 202 is not a human, wait until some predetermined condition is satisfied before hanging up on the caller 202, and may continue to record the call until hanging up. As examples of such a predetermined condition, the call screening and monitoring server 210 may wait for the caller 202 to finish speaking, wait for the caller 202 to hang up, or wait for a timer to expire before hanging up (if the caller 202 has not already hung up) the call and terminating the recording of the caller 202's spiel.

If the call screening and monitoring server 210 determines that the caller 202 is a human, then the call screening and monitoring server 210 grants the caller 202 with access to the callee 252 (FIG. 1A, operation 122). In some embodiments, the call screening and monitoring server 210 deletes the caller 202's screening answers (within the screening answers 226) if the caller 202 is determined to be a human.

If the call screening and monitoring server 210 grants the caller 202 with access to the callee 252 in any of the ways disclosed above (FIG. 1A, operation 122) (e.g., if: (1) the caller 202 is on the callee 252's allow list 214, or (2) the caller 202 is not on the callee 252's allow list 214 and the caller 202 is not on the callee 252's block list 216 and the call screening and monitoring server 210 determines that the caller 202 is a human), then the call screening and monitoring server 210 determines whether a Do Not Disturb feature associated with the callee 252 account or the particular caller 202 is active (FIG. 1A, operation 124).

The term "Do Not Disturb feature" (also referred to herein simply as "DND") refers generally to any feature, function, setting, or module, associated with the callee 252 (e.g., in the callee 252's account 212, on the callee 252's telephone system 254, and/or on the callee 252's computing device 256), which may be in an active state or an inactive state (and possibly other states), and in which the active state indicates that telephone calls (and possibly other types of communications and/or notifications) directed to the callee 252 should be blocked or should otherwise not cause the callee 252's telephone system 254 to ring or otherwise notify the callee 252 of that telephone call. Particular implementations of DND may or may not have the terms "do not disturb" or "DND" in their names, but nonetheless qualify as implementations of DND if they satisfy the definition above.

If the call screening and monitoring server 210 determines that DND is active, then the call screening and monitoring server 210 may invite the caller to leave a voicemail (which may be stored in the voicemail messages 220), update the call log for the incoming call, and hang up on the incoming call (FIG. 1A, operation 126). If the call screening and monitoring server 210 does not determine that DND is active, then the call screening and monitoring server 210 may forward the call from the caller 202 to a telephone device associated with the callee 252, such as the telephone number of the callee 252's telephone system 254, which may be the telephone number that the caller 202 dialed on the caller 202's telephone system 204 to initiate the method 100 (FIG. 1B, operation 128). The call screening and monitoring server 210 may forward the call by, for example, placing a new telephone call to the telephone device associated with the callee 252, such as by placing a SIP telephone call to that telephone device.

Before describing the remainder of the method 100 of FIGS. 1A-1B, it should be understood that various steps of that method 100 may be omitted and/or performed in different orders than those shown in FIG. 1 and described herein. As some examples:

The method 100 need not determine whether the caller 202 is on the allow list 214 (FIG. 1A, operation 108).

If this determination is omitted, then the method 100 may proceed, for example, directly from operation 106 to operation 110 or 114.

The method 100 need not determine whether the caller 202 is on the block list 216 (FIG. 1A, operation 110). If this determination is omitted, then the method 100 may proceed, for example, directly from operation 108 to operation 114.

The method 100 may swap the order of operations 108 and 110, in which case the "no" output branch of operation 110 may lead to operation 108, and the "no" output branch of operation 108 may lead to operation 114.

The method 100 need not determine whether DND is active (FIG. 1A, operation 124). If this determination is omitted, then the method 100 may proceed, for example, directly from operation 122 to operation 128.

Returning to the method 100 and system 200, if the callee 252 does not answer the telephone call placed in operation 128, e.g., after some predetermined number of rings or amount of time, then the call screening and monitoring server 210 may save any recording that has been made of the caller 202 during the call, log the call, and hang up (FIG. 1B, operation 132). The call screening and monitoring server 210 may, as part of operation 132, also record a voicemail message 220 from the caller 202, such as by using any known techniques for recording voicemail messages. For example, in response to the callee 252 not answering the telephone call placed in operation 128, the call screening and monitoring server 210 may place a voicemail greeting to the caller 202, in response to which the caller 202 may speak, or otherwise provide audio output. The call screening and monitoring server 210 may record that audio output as a voicemail message 220 associated with the caller 202 and the callee 252. The call screening and monitoring server 210 may, for example, store the voicemail message within, or otherwise in association with, the callee 252's account 212, such as by storing metadata identifying the callee 252 within, or otherwise in association with, the voicemail message 220. The voicemail messages 220 shown in FIG. 2A may include one or a plurality of voicemail messages associated with the callee 252, and one or a plurality of voicemail messages associated with one or a plurality of callees other than the callee 252.

If the callee 252 does answer the telephone call placed in operation 128 (such as by answering the telephone call on the telephone system 254 or the computing device 256), then the call is in progress (FIG. 1B, operation 134). It should be understood that the call being in progress in operation 134 may be a state of the system 200 and may not involve the method 100 performing any particular actions.

At any time during the call between the caller 202 and the callee 252, the callee 252 may provide input 260 requesting that a voice memo be recorded. The callee 252 may, for example, provide the input 260 via the telephone system 254 or the computing device 256. The input 260 (also referred to herein as a "memo command") may take any of a variety of forms, such as a voice command (e.g., "record memo") or the pressing of a button by the callee 252 in a graphical user interface of the telephone system 254 and/or computing device 256. Regardless of how the callee 252 provides the memo command 260, the system 200 receives the memo command 260 (FIG. 1B, operation 136). The memo command 260 may, for example, be transmitted over the network 230 to, and be received by, the call screening and monitoring server 210. At any time after providing the memo command 260, the callee 252 may speak, and the speech of the caller 202 and/or callee 252 may be captured (e.g., by a microphone in the telephone system 254 and/or computing device 256) and recorded as a memo 222 associated with the callee 252 (FIG. 1B, operation 138).

Once the call screening and monitoring server 210 begins to record a memo, the call screening and monitoring server 210 may continue to record the memo until a predetermined amount of time (e.g., 10 seconds) has elapsed, until the call terminates, or until the callee 252 provides input (e.g., selecting the "Memo" button again) indicating that recording should terminate.

The call screening and monitoring server 210 may, for example, store the memo within, or otherwise in association with, the callee 252's account 212, such as by storing metadata identifying the callee 252 within, or otherwise in association with, the memo 222. The memos 222 shown in FIG. 2A may include one or a plurality of memos 222 associated with the callee 252, and one or a plurality of memos 222 associated with one or a plurality of callees other than the callee 252.

More generally, the call screening and monitoring server 210 may record any portions of the telephone call between the caller 202, callee 252, and any helpers (see description below) and store such recording(s) within the memos 222. Such memos 222 may include some or all of the audio of the telephone call (e.g., speech of the caller 202, callee 252, and any helpers 224 who participate in the telephone call, and any audio generated by the call screening and monitoring server 210 within the telephone call) during any portion(s) of that telephone call. The call screening and monitoring server 210 may generate and store such memos 222 in response to input from the callee 252 or automatically, e.g., upon initiation of the telephone call, or upon a helper joining the telephone call.

At any time during the call between the caller 202 and the callee 252, the callee 252 may provide input 262 representing a request for help. The callee 252 may, for example, provide the input 262 via the telephone system 254 or the computing device 256. The input 262 (also referred to herein as a "help request") may take any of a variety of forms, such as a voice command (e.g., "I need help") or the pressing of a button by the callee 252 in a graphical user interface of the telephone system 254 and/or computing device 256. Regardless of how the callee 252 provides the help request 262, the system 200 receives the help request 262 (FIG. 1B, operation 140). The help request 262 may, for example, be transmitted over the network 230 to, and be received by, the call screening and monitoring server 210.

The call screening and monitoring server 210 identifies within the plurality of helpers 224, a set of helpers 272a-n (see FIG. 2B) who are associated with the callee 252 (FIG. 1B, operation 142). For example, the helpers 224 may include a first plurality of helpers associated with the callee 252, a second plurality of helpers associated with another callee (not shown), a third plurality of helpers associated with yet another callee (not shown), etc. Each such set of helpers, associated with a particular corresponding callee, may be stored within, or otherwise in association with, that callee's account 212. For each of the plurality of helpers 272a-n associated with the callee 252, the helper data 224 may include, for example, any one or more of the following, in any combination:

Name of the helper
Telephone number of the helper
Email address of the helper
Preferred notification method (e.g., telephone call or text message)
Relationship of the helper to the callee 252
Whether the helper is the callee 252's default helper Although three helpers 272a-n are shown in FIG. 2B as being associated with the callee 252 (i.e., n=3), this is merely an example and does not constitute a limitation of the present invention. Any number of helpers may be associated with the callee 252, different helpers (and different numbers of helpers) may be associated with different callees.

Furthermore, each of the helpers 272a-n may have their own telephone system (which may have any of the properties of the telephone systems 204 and/or 254) and/or computing device (which may have any of the properties of the computing 256). Although such telephone systems and computing devices are not shown in FIG. 2B for ease of illustration, it should be understood that the functions disclosed herein (such as receiving and transmitting messages from and to the call screening and monitoring server, and participating in telephone calls with the callee 252) may be performed using such telephone systems and/or computing devices.

Once the call screening and monitoring server 210 has identified the plurality of helpers 272a-n that is associated with the callee 252, the call screening and monitoring server 210 may notify each of the identified plurality of helpers 272a-n of the help request 262 (FIG. 1B, operation 144). Such notification may be performed in any of a variety of ways, such as by making a telephone call and/or sending help request messages 274a-n (e.g., text message or intra-app message) to each of the identified helpers 272a-n. The call screening and monitoring server 210 may, for example, identify a destination identifier (e.g., telephone number) of each of the identified helpers 272a-n within the helper data 224 and use the identified destination identifier to notify the identified helper of the help request 262 (e.g., by making a telephone call and/or sending a text message to the identified destination identifier).

As a particular example, the call screening and monitoring server 210 may, for each of the identified helpers 272a-n, identify that helper's preferred notification method (e.g., telephone call or text message) based on that helper's data within the helper data 224, and then notify that helper of the help request via the identified preferred notification method. This may result in notifying some of the identified helpers 272a-n of the help request via one notification method (e.g., telephone call) and other identified helpers 272a-n of the help request via a different notification method (e.g., text message).

At any point after being notified of the callee 252's help request 262, such as after notifying the identified helpers 272a-n of the help request 262, the call screening and monitoring server 210 may notify the callee 252 that the identified helpers 272a-n have been notified of the help request 262. Such a notification may take any of a variety of forms, such as audio output and/or visual output (e.g., audio and/or text conveying the message, "Your help request has been received and your helpers are being notified") provided to the callee 252 via the telephone system 254 and/or computing device 256. Such notification output may identify the identified helpers 272a-n using any suitable identifying information, such as telephone number and/or name.

Such notification may be provided to the callee 252, but not to the caller 202. For example, the call screening and monitoring server 210 may provide audio output representing the notification on the callee 252's telephone system 254 and/or computing device 256, but not on the caller 202's telephone system 204.

At any point after receiving the help request 262 from the callee 252, the call screening and monitoring server 210 may begin to record the telephone call between the caller 202 and the callee 252, and may continue to record the telephone call for any amount of time, such as until the completion of the call in operation 158 (FIG. 1B, operation 146). The recording may be stored as a memo (within the memos 222) by the call screening and monitoring server 210. The recorded memos 222 may include recordings from any number of such telephone calls.

Any of the identified helpers 272a-n may provide input 276 indicating that helper's acceptance of the callee 252's help request (FIG. 1B, operation 148). A helper may indicate such acceptance in any of a variety of ways, such as by providing voice input indicating acceptance (e.g., "I accept") or by providing input via a graphical user interface on a computing device (e.g., by clicking on or tapping an "Accept") button. Regardless of how the acceptance input 276 is provided, the call screening and monitoring server 210 receives the helper's input indicating acceptance 276. Any such helper is referred to herein as an "accepting helper."

In some embodiments of the present invention, if none of the identified helpers 272a-n provides input indicating acceptance of the callee 252's help request within some predetermined amount of time (e.g., 60 seconds), then the call screening and monitoring server 210 may either: (1) notify another helper (who is not one of the identified helpers 272a-n, and who is referred to herein as an "administrative helper") of the callee 252's help request 262 in the same manner as described above in connection with the notifications of the identified helpers 272a-n to the call; or (2) automatically join the administrative helper to the existing call between the caller 202 and callee 252. The administrative helper may, for example, be an employee or other agent of the entity that operates the call screening and monitoring server. If the administrative helper joins the call, then that administrative helper may participate in the call in any of the ways described herein in connection with an accepting helper.

In response to receiving the acceptance input 276 from the accepting helper (or in response to automatically joining an administrative helper to the call), the call screening and monitoring server 210 may connect the accepting helper to the existing telephone call between the caller 202 and the callee 252, thereby creating a conference call among the caller 202, the callee 252, and the accepting helper (FIG. 1B, operation 150). As a result, any of the caller 202, the callee 252, and the accepting helper may speak on the call and be heard by the other participants to the call. The call screening and monitoring server 210 may automatically begin to record the telephone call in response to the accepting helper joining the telephone call. Such recording may include any input received from any of the call participants (e.g., the caller 202, the callee 252, and any of the participating helpers), such as audio (e.g., speech) and/or touch tones received from such participants. The call screening and monitoring server 210 may continue to record such input until any of a variety of triggering events occurs, such as the call ending, a predetermined amount of time elapsing, or one or more of the call participants exiting the call.

The call screening and monitoring server 210 may provide output, to the accepting helper, notifying the accepting helper that his or her acceptance has resulted in him or her being added to the call between the caller 202 and the callee 252 (FIG. 1B, operation 152). Such notification output may take any of a variety of forms, such as audio output and/or visual output (e.g., audio and/or text conveying the message, "Thanks for your acceptance of the help request; you are being connected to the call") provided to the accepting helper via a telephone system and/or computing device. Such notification output may identify the caller 202 and/or callee 252 using any suitable identifying information, such as telephone number and/or name.

Similarly, the call screening and monitoring server 210 may provide output 278, to the callee 252, notifying the callee 252 that his or her help request has been accepted by the accepting helper (FIG. 1B, operation 154). Such notification output 278 may take any of a variety of forms, such as audio output and/or visual output (e.g., audio and/or text conveying the message, "Your help request has been accepted by Bob, who is being added to the call") provided to the callee 252 via the telephone system 254 and/or computing device 256. Such notification output 278 may identify the accepting helper using any suitable identifying information, such as telephone number and/or name.

Such notification output 278 may be provided to the callee 252, but not to the caller 202. For example, the call screening and monitoring server 210 may provide audio output representing the notification 278 on the callee 252's telephone system 254 and/or computing device 256, but not on the caller 202's telephone system 204.

In certain embodiments of the present invention, at most one helper may accept the callee 252's help request 262. In such embodiments, in response to one of the helpers 272a-n accepting the callee 252's help request, the call monitoring and screening server 210 does not permit any additional helpers 272a-n to accept the callee 252's help request, thereby effectively terminating the help request 262 for all but the one accepting helper.

In other embodiments of the present invention, a plurality of the helpers 272a-n may accept the callee 252's help request 262. In such embodiments, the system 200 may perform, for each such accepting helper, operations 148-152, as shown in FIG. 1B and described herein. As a result, in such embodiments, a plurality of the accepting helpers 272a-n may be connected to the existing telephone call between the caller 202 and callee 252, thereby creating a conference call with four or more participants (namely, the caller 202, the callee 252, and each of the plurality of accepting helpers).

Whether the system 200 permits only a single accepting helper or permits a plurality of accepting helpers, in response to any one of the helpers 272a-n associated with the callee 252 accepting the callee 252's help request 262, the call screening and monitoring server 210 may provide output 280 notifying all of the helpers 272a-n who have not yet accepted the callee 252's help request 262 that the other helper(s) have accepted the callee 252's help request 262 (FIG. 1B, operation 156). Such notification output 280 may take any of a variety of forms, such as audio output and/or visual output (e.g., audio and/or text conveying the message, "Another helper has accepted the help request; your help is no longer needed" or "Another helper has accepted the help request; you may still accept the help request as well") provided to the remaining (non-accepting) helpers via a telephone system and/or computing device.

The caller 202, callee 252, and any accepting helpers may participate in the created conference call by speaking to each other. As described above, the call screening and monitoring server 210 may record such a telephone call, including recording any audio signals representing speech of the caller 202, callee 252, and/or any accepting helpers, within the recorded memos 222.

If, at any point in the call between the caller 202 and callee 252, either the caller 202 or callee 252 hangs up the call (FIG. 1B, operation 158), the call screening and monitoring server 210 detects the hang up, and logs the call within the call logs 218 (FIG. 1B, operation 160).

The description above assumes that the set of helpers 224 already exists. Embodiments of the present invention may use a variety of techniques to generate the set of helpers 224 before the performance of the method 100 of FIGS. 1A-1B, and to update the set of helpers after the performance of the method 100 of FIGS. 1A-1B. For example, the callee 252 may use software (which may, for example, execute on the telephone system 254 and/or the computing device 256), referred to herein as a call screening and monitoring client, to generate and/or update the data representing the callee 252's helpers within the helper data 224. The callee 252 may, for example, provide input, to the call screening and monitoring client, requesting that a particular person be added to the callee 252's list of helpers. Such input may include information the proposed helper, such as any of the data described above as being included within the helper data 224 (e.g., the proposed helper's name, telephone number, email address, etc.)

In response to receiving that input from the callee 252, the system 200 (e.g., the call screening and monitoring server 210 and/or the call screening and monitoring client) may transmit or otherwise provide a request to the proposed helper, such as by providing output, on a telephone and/or computing device of the proposed helper, representing the request. The proposed helper may then provide input indicating whether the proposed helper accepts the request. If the input from the proposed helper indicates that the proposed helper accepts the request, then the system 200 may add the proposed helper to the callee 252's list of helpers within the helper data 224, including any information provided about the proposed helper by the callee 252 and/or the proposed helper.

One data field that may be included within each helper's record within the helper data 224 is a "status" field, which may have permissible values including "active" and "paused." When a new helper is added to the callee 252's helper list in the helper data 224, the system 200 may set the value of that helper's status field to "active" by default. When the call screening and monitoring server 210 identifies the helpers to notify in response to the callee 252's request for help in operation 142 of FIG. 1B, the call screening and monitoring server 210 may identify the helpers within the helper data 224 who: (1) are associated with the callee 252; and (2) who have a status field with a status of "active." The call screening and monitoring server 210 may then only notify (in operation 144 of FIG. 1B) the identified helpers. As this implies, the call screening and monitoring server may not notify (in operation 144 of FIG. 1B) helpers who are associated with the callee 252, but whose status field has a status of "paused."

At any time, the system 200 may change the value of any helper's status field (e.g., from "active" to "paused" or from "paused" to "active"). The system 200 may make such a change, for example, in response to input from that helper or from the callee 252. Such input may, for example, specify the desired new value of the helper's status field, or may specify that the value of the helper's status field is to be toggled (e.g., changed from "active" to "paused" if its current value is active, or from "paused" to "active" if its current value is "paused").

Referring to FIGS. 3A-3F, examples of user interfaces are shown which may be used by embodiments of the present invention to add, modify, and remove helpers who are associated with the callee 252 according to one embodiment of the present invention. The user interfaces of FIGS. 3A-3F may, for example, provide output from and provide input to any one or more of the following, in any combination: the call screening and monitoring server 210, the callee 252's telephone system 254, and the callee 252's computing device 256. As just one particular example, a call screening and monitoring client may execute on the callee 252's telephone system 254, which may be a smartphone, and which may display the user interfaces of FIGS. 3A-3F and which may perform all of the functions disclosed herein in connection with those user interfaces. The user interfaces of FIGS. 3A-3F are merely examples and do not constitute limitations of the present invention.

For purposes of example, the following description refers to the callee 252 and the callee 252's list of helpers within the helper data 224. That description applies equally to any other callee and that callee's list of helpers within the helper data 224.

Figure 3A:
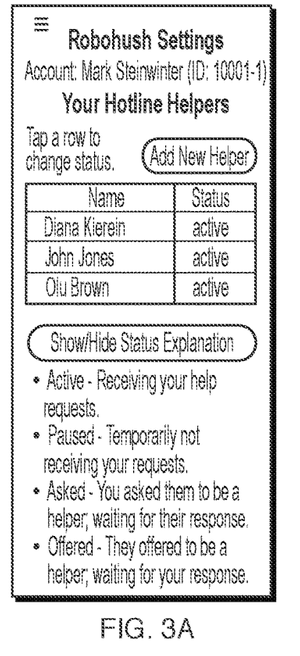
FIGS. 3A-3F are user interfaces for displaying, modifying, adding, and deleting helpers associated with a callee according to one embodiment of the present invention.
Figure 3B:
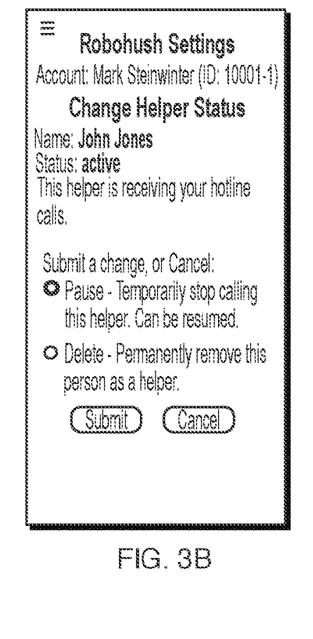

Referring to FIG. 3A, a user interface is shown which display's the callee 252's current list of helpers. The callee 252 may cause the system 200 to display the user interface of FIG. 3A in any of a variety of ways, such as by saying "Show Helpers" or by selecting a "Show Helpers" button. The user interface includes a table that displays the callee 252's current list of helpers. The table includes two columns: Name and Status. For purposes example, the table in FIG. 3A includes three rows containing data representing three corresponding helpers associated with the callee 252. In the example of FIG. 3A, all of the callee 252's helpers have a status of "active," but this is merely an example.

If the callee 252 wishes to change data associated with any of the helpers associated with the callee 252 (e.g., any of the helpers shown in FIG. 3A), the callee 252 may provide input, to the system 200, representing a request to modify data associated with a particular one of the helpers, such as by tapping on the row representing that helper in the user interface of FIG. 3A. In response to receiving such input from the callee 252, the system 200 may display the user interface of FIG. 3B to the callee 252 to enable the callee 252 to modify the data (within the helper data 224) associated with the selected helper. In the particular example of FIG. 3B, the user interface enables the callee 252 to change the status of the selected helper from "active" to "pause," by selecting a radio button associated with the value of "pause." (If the current value of the selected helper's status field was instead "pause," then the user interface of FIG. 3B would instead enable the callee 252 to change the value of that status field from "pause" to "active.") The user interface of FIG. 3B also enables the callee 252 to delete the selected helper from the callee 252's list of helpers by selecting a radio button associated with a "delete" command. The callee 252 may select a "submit" button, in response to which the system 200 may modify the selected helper's data in the manner specified by the callee 252 in the user interface (e.g., by changing the selected helper's status to "pause" or by deleting the selected helper from the callee 252's helper list). The callee 252 may cancel any changes specified in the user interface by selecting a "Cancel" button.

Figure 3C:
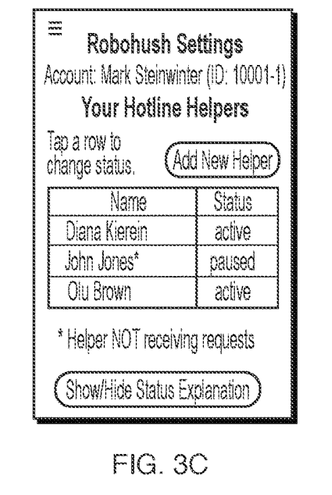

Assume, for purposes of example, that the callee 252 changed the status of the helper named "John Jones" to "paused." This change is reflected in the user interface of FIG. 3C, which is the same as the user interface of FIG. 3A, except that the status of the helper named "John Jones" is shown as "paused" instead of "active."

Figure 3D:
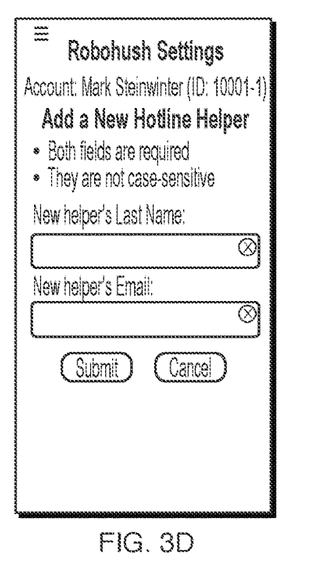

The callee 252 may add a new helper to the callee 252's helper list by, for example, selecting the "Add New Helper" button in the user interface of FIG. 3A or 3C, in response to which the system 200 may display the user interface of FIG. 3D. To add a new helper, the callee 252 may enter information identifying the new helper, such as any one or more of the following, in any combination: full name, telephone number, and email address. The callee 252 may submit the entered information by selecting the "Submit" button, in response to which the system 200 may add a new helper, with the information entered in the user interface of FIG. 3D, to the callee 252's list of helpers. In some embodiments of the present invention, the system 200 only adds the new helper to the callee 252's list of helpers in response to receiving acceptance, from the new helper, of the callee 252's request to add the new helper.

Figure 3E:
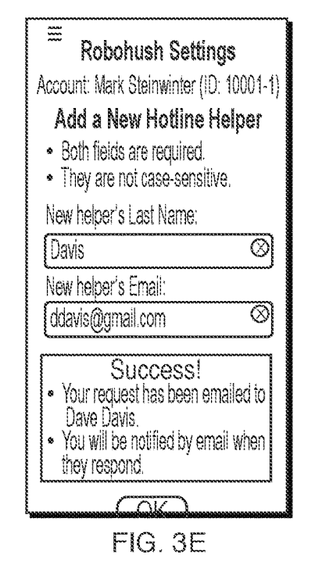
Figure 3F:
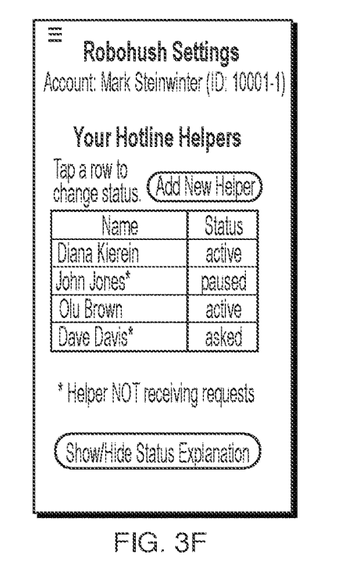

FIG. 3E shows a user interface in which a new helper's information has been entered, and in which a message is displayed which indicates that the new helper has been added successfully. FIG. 3F shows a user interface in which the callee 252's list of helpers has been updated to include the newly-added helper.

The drawings and descriptions herein refer to a variety of audio records that may be generated and stored by the call screening and monitoring server, such as the voicemail messages 220, the memos 222, and the telephone calls 226. Embodiments of the present invention may enable the callee 252 and/or the helpers 272*a-n* to play back such audio recordings. For example, embodiments of the present invention may present the callee 252 and/or the helpers 272*a-n* with one or more suitable user interfaces displaying information describing such audio recordings, in response to which the callee 252 and/or the helpers 272*a-n* may provide input representing a command to play back a particular one of the audio recordings. In response, the call screening and monitoring server 210 may play back the selected audio recording.

Similarly, embodiments of the present invention may enable the callee 252 and/or the helpers 272*a-n* to share any such audio recording with another user by email, text message, or other form of message. As a particular example, if the caller 202 attempted to call the callee 252 but did not pass the screening process described above in connection with operations 114-116 in FIG. 1A, then the call screening and monitoring server 210 may, as described above, record and store all audio input (e.g., speech) received from the caller 202 during the screening process. After that call with the caller 202 has terminated, the call screening and monitoring server 210 may display a log of that call to the callee 252, which may include displaying the date of the call, the telephone number of the call, and the name of the caller 202 (if known). In response, the callee 252 may provide input representing a command to play a recording of the caller 202. In response to receiving that input, the call screening and monitoring server 210 may play the recording of the caller 202 to the callee 252. Similarly, the callee 252 may provide input representing a command to forward the recording of the caller 202 to a third party (e.g., one of the helpers 272*a-n*), in response to which the call screening and monitoring server 210 may forward the recording of the caller 202 to the specified third party. These functions enable the callee 252 to share calls from callers with their helpers 272*a-n* and other trusted third parties in order to obtain assistance in determining whether to call the caller 202 back.

At any point during or after a telephone call involving the caller 202 and callee 252, the callee 252 may provide input representing a command to add the caller 202 to the callee 252's allow list. In response to receiving such input, the call screening and monitoring server 210 may add the caller 202 to the callee 252's allow list.

Embodiments of the present invention have a variety of advantages, including the following. Existing technologies for blocking robocalls tend to exhibit large numbers of false negatives, i.e., they tend not to block unwanted callers who should be blocked, merely because the telephone numbers of such callers are not on existing block lists. Embodiments of the present invention overcome this drawback by, for example, using screening questions to screen callers and only allowing such callers to reach the intended callee if they accurately answer the screening questions.

Existing technologies that block robocalls do not protect a callee from live telemarketers or scammers. Embodiments of the present invention overcome this drawback by, for example, making it easy for a callee to summon help during a call from any number of pre-arranged family members, friends, or other trusted parties.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may automatically connect helpers to a telephone call to create a conference call. As another example, embodiments of the present invention may block callers from reaching a callee automatically. These functions are inherently rooted in computer and telecommunications technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by at least one computer processor executing computer program instructions stored on at least one non-transitory computer-readable medium, the method comprising:
   (A) receiving, from a callee, during a first telephone call between a caller and the callee, input representing a request for help;
   (B) identifying, in response to the input representing the request for help, a plurality of helpers associated with the callee, using a list of the plurality of helpers stored in an account of the callee;
   (C) receiving, from a particular one of the plurality of helpers associated with the callee, input representing acceptance of the request for help;
   (D) connecting the particular one of the plurality of helpers to the first telephone call in response to receiving the input representing acceptance of the request for help, thereby resulting in a conference call between the caller, the callee, and the particular one of the plurality of helpers;
   (E) notifying the particular one of the plurality of helpers that the particular one of the plurality of helpers has been connected to the first telephone call; and
   (F) notifying each of the plurality of helpers other than the particular one of the plurality of helpers that the particular one of the plurality of helpers has been connected to the first telephone call.

2. The method of claim 1, further comprising:
   (G) after (B) and before (C), generating, for each of the plurality of helpers, a corresponding request for help.

3. The method of claim 2, wherein (G) comprises transmitting, to each of the plurality of helpers, a corresponding message requesting help.

4. The method of claim 3, wherein each of the corresponding messages comprises a text message.

5. The method of claim 2, wherein (G) comprises generating, for each of the plurality of helpers, output representing a corresponding request for help.

6. The method of claim 1, further comprising:
   (G) notifying the callee that the particular one of the plurality of helpers has been connected to the first telephone call.

7. The method of claim 1, further comprising, before (A):
   (G) receiving a second telephone call from the caller to the callee;
   (H) determining whether the caller is on an allow list;
   (I) in response to determining that the caller is on the allow list, initiating the first telephone call from the caller to the callee.

8. The method of claim 1, further comprising, before (A):
(G) receiving a second telephone call from the caller to the callee;
(H) determining whether the caller is on an allow list;
(I) in response to determining that the caller is on the allow list, determining whether a do not disturb mode associated with the callee is active;
(J) in response to determining that the do not disturb mode associated with the callee is not active, initiating the first telephone call from the caller to the callee.

9. The method of claim 1, further comprising, before (A):
(G) receiving a second telephone call from the caller to the callee;
(H) determining whether the caller is on a block list;
(I) in response to determining that the caller is not on the block list, initiating the first telephone call from the caller to the callee.

10. The method of claim 1, further comprising, before (A):
(G) receiving a second telephone call from the caller to the callee;
(H) determining whether the caller is on a block list;
(I) in response to determining that the caller is not on the block list, determining whether the caller is human;
(J) in response to determining that the caller is human, initiating the first telephone call from the caller to the callee.

11. The method of claim 1, further comprising:
(G) receiving, from the callee, input representing a request to record a memo;
(H) in response to receiving the input representing the request to record the memo:
(H) (1) receiving audio input from the callee; and
(H) (2) recording the audio input from the callee as a memo.

12. A system comprising at least one non-transitory computer-readable medium having computer program instructions stored thereon, the computer program instructions being executable by at least one computer processor to perform a method, the method comprising:
(A) receiving, from a callee, during a first telephone call between a caller and the callee, input representing a request for help;
(B) identifying, in response to the input representing the request for help, a plurality of helpers associated with the callee, using a list of the plurality of helpers stored in an account of the callee;
(C) receiving, from a particular one of the plurality of helpers associated with the callee, input representing acceptance of the request for help; and
(D) connecting the particular one of the plurality of helpers to the first telephone call in response to receiving the input representing acceptance of the request for help, thereby resulting in a conference call between the caller, the callee, and the particular one of the plurality of helpers;
(E) notifying the particular one of the plurality of helpers that the particular one of the plurality of helpers has been connected to the first telephone call; and
(F) notifying each of the plurality of helpers other than the particular one of the plurality of helpers that the particular one of the plurality of helpers has been connected to the first telephone call.

13. The system of claim 12, wherein the method further comprises:
(G) after (B) and before (C), generating, for each of the plurality of helpers, a corresponding request for help.

14. The system of claim 13, wherein (G) comprises transmitting, to each of the plurality of helpers, a corresponding message requesting help.

15. The system of claim 14, wherein each of the corresponding messages comprises a text message.

16. The system of claim 13, wherein (G) comprises generating, for each of the plurality of helpers, output representing a corresponding request for help.

17. The system of claim 12, wherein the method further comprises:
(G) notifying the callee that the particular one of the plurality of helpers has been connected to the first telephone call.

18. The system of claim 12, wherein the method further comprises, before (A):
(G) receiving a second telephone call from the caller to the callee;
(H) determining whether the caller is on an allow list;
(I) in response to determining that the caller is on the allow list, initiating the first telephone call from the caller to the callee.

19. The system of claim 12, wherein the method further comprising, before (A):
(G) receiving a second telephone call from the caller to the callee;
(H) determining whether the caller is on an allow list;
(I) in response to determining that the caller is on the allow list, determining whether a do not disturb mode associated with the callee is active;
(J) in response to determining that the do not disturb mode associated with the callee is not active, initiating the first telephone call from the caller to the callee.

20. The system of claim 12, wherein the method further comprises, before (A):
(G) receiving a second telephone call from the caller to the callee;
(H) determining whether the caller is on a block list;
(I) in response to determining that the caller is not on the block list, initiating the first telephone call from the caller to the callee.

21. The system of claim 12, wherein the method further comprises, before (A):
(G) receiving a second telephone call from the caller to the callee;
(H) determining whether the caller is on a block list;
(I) in response to determining that the caller is not on the block list, determining whether the caller is human;
(J) in response to determining that the caller is human, initiating the first telephone call from the caller to the callee.

22. The system of claim 12, wherein the method further comprises:
(G) receiving, from the callee, input representing a request to record a memo;
(H) in response to receiving the input representing the request to record the memo:
(H) (1) receiving audio input from the callee; and
(H) (2) recording the audio input from the callee as a memo.

\* \* \* \* \*